United States Patent

[11] 3,625,790

| [72] | Inventor | Weldon R. Ayres |
| | | R.F.D. #1, Willard, Ohio 44890 |
| [21] | Appl. No. | 836,801 |
| [22] | Filed | June 26, 1969 |
| [45] | Patented | Dec. 7, 1971 |

[54] PROCESS FOR MAKING GLOVES
11 Claims, 7 Drawing Figs.

[52] U.S. Cl. .................................................. 156/93,
2/159, 156/251
[51] Int. Cl. ...................................................... B32b 7/08
[50] Field of Search ........................................... 156/93, 92,
320, 283, 251; 2/159, 164; 223/39; 229/17 G

[56] References Cited
UNITED STATES PATENTS

| 1,554,291 | 9/1925 | Peck............................. | 2/159 |
| 2,298,522 | 10/1942 | Waters......................... | 156/320 X |
| 2,683,679 | 7/1954 | Hurd et al..................... | 156/92 X |
| 2,847,676 | 8/1958 | Scott............................. | 2/159 |

Primary Examiner—Samuel Feinberg
Assistant Examiner—Daniel A. Bent
Attorney—Oldham & Oldham ABSTRACT: The glove-making process includes forming a laminate from an elastic fabric and a layer of thermoplastic material, superimposing two of the laminates with the plastic layers adjacent, securing the layers of laminates together in areas thereof to form glove shells therefrom and severing such glove shells from the laminates, heating the glove shells, stretching the glove shells onto a glove form to shape the shells to individual right or left glove shapes, and heating and cooling to complete the glove.

PATENTED DEC 7 1971

3,625,790

INVENTOR.
WELDON R. AYRES
BY
*Oldham & Oldham*
ATTORNEYS

PROCESS FOR MAKING GLOVES

In general, the present invention relates to a glove-making method and particularly to an improved method of making gloves from a glove shell made from a special laminated materials.

BACKGROUND OF THE INVENTION

In U.S. Pat. No. 2,716,241, a process if disclosed for making right and left gloves from ambidextrous glove shells. Such process has been used commercially with excellent results. Such process avoids the formation of left and right glove shells in making pairs of gloves and has improved the character of the gloves produced. However, such prior patent still required, in most instances, the dipping of the glove shell when on a form into suitable bath of material for coating the glove shell and forming an outer layer thereon and then curing or other treatment of the dipped material to set it in final form.

The general object of the present invention is to provide a novel and improved laminate for use in forming ambidextrous glove shells therefrom and to an improved method for utilizing such glove shells in glove production.

Another object of the invention is to provide an improved process for forming gloves made from layers of plastic and elastic fabric material and to reduce the cost and number of operations involved in glove forming processes.

A further object of the invention is to utilize a special laminate in an improved manner to form gloves by an improved, lower cost process.

The foregoing and other objects and advantages of the invention will be made more apparent as the specification proceeds.

INVENTIVE DISCLOSURE

The present invention particularly relates to a unique process or method for forming gloves comprising the steps of associating a pair of laminates each formed from an elastic fabric and a layer of plastic film together with the plastic film layers adjacent, securing the laminates together in local areas to form glove shell shapes therefrom, severing the glove shells from the laminates, heating the glove shells, drawing the shells onto glove forms, and then following known procedures to complete the glove and form right and left gloves from, usually, ambidextrous glove shells by known processes and steps.

Attention now is particularly directed to the accompanying drawings, wherein.

When referring to corresponding members shown in the drawings and referred to in the specification, corresponding numerals are used to facilitate comparison therebetween.

Figure 1:
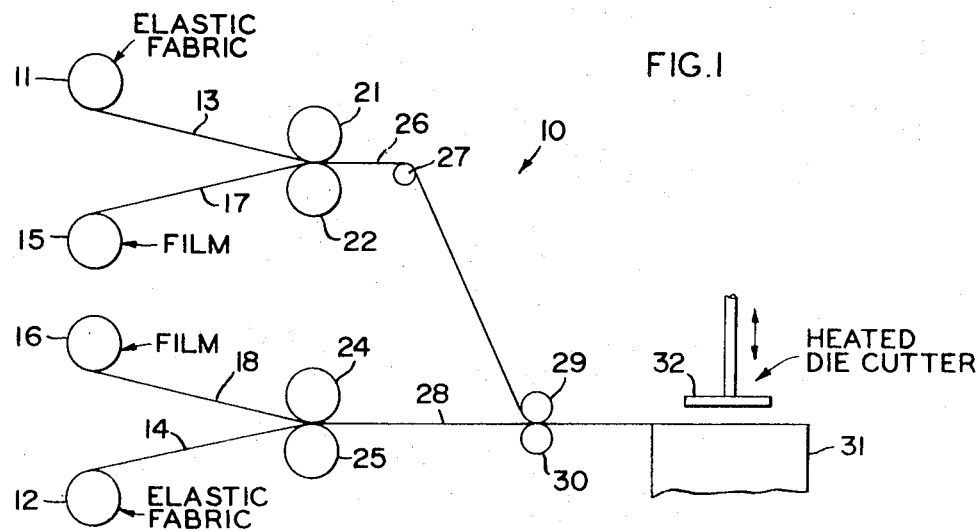
FIG. 1 is a diagrammatic view of apparatus for performing certain steps in the process of the invention.

Attention now is directed to the details of the structure shown in the accompanying drawings, and FIG. 1 indicates as a whole by the numeral 10 apparatus shown diagrammatically for performing a portion of the steps of the present process for making gloves. This apparatus 10 includes rolls 11 and 12 on which suitable elastic fabrics are stored to provide layers or sheets of elastic fabric 13 and 14 which are of, usually, a knit construction, and which have resilience and/or elasticity therein to permit the shaping, stretching or forming of articles made from these fabric sheets or layers, as hereinafter described. The fabrics 13 and 14 are of any known construction, thickness, resiliency, etc. In this instance, rolls 15 and 16 are also provided as storage for layers or sheets of a thermoplastic film 17 and 18. These layers of film usually are relatively thin, such as approximately 0.03 to approximately 0.020 inch or more in thickness, and are made from any conventional thermoplastic materials including but not limited to polyvinyl chloride, polyethylene, or polypropylene resins, and the like. The individual layers of film may have any suitable compounding ingredients therein such as about 85 parts of a conventional plasticizer to 100 parts of resin and about 2 to 5 parts of a heat stabilizer. The film layers and fabric layers 17 and 13, and 18 and 14, respectively, then usually are just mechanically associated with each other by passing between pairs of pressure rolls 21 and 22, and 24 and 25, as shown. If desired, these rolls may be heated slightly above room temperature at about 130° to 140° F. to aid in obtaining good embedment and attachment of the individual film layers or sheets to the elastic fabrics to provide a unitary laminate from each of such pairs of materials. Then the laminate 26, for example, can pass over a guide roll 27 after which the second laminate 28 formed between the rolls 24 and 25 and the laminate 26 are brought into physical superimposed relationship as by passing between guide rolls 29 and 30, as indicated in the drawing.

From the guide rolls 29 and 30, the individual laminates 26 and 28 in superimposed relationship with the film layers on the two laminates being adjacent each other, then can move along or be guided across a suitable fixed member, such as a table or support 31. The laminates may be, for example, about 0.020 to 0.035 inch thick.

In order to provide ambidextrous glove shells from the laminates of material passing between the rolls 29 and 30, in this instance, a heated articulate diecutter indicated as a whole by the numeral 32, is provided. This diecutter may be adapted to cut one or a plurality of glove shells from the superimposed laminates 26 and 28 and any conventional means (not shown) are attached to the heated diecutter 32 for reciprocating it in a vertical direction so that it can be brought forcibly down to engage the material on the support 31 to stamp or cut individual ambidextrous glove shells 40 from the laminated materials. Initially, the die 32 usually would be brought into contact with the laminates to heat-seal a glove shell margin area of the laminates together, preferably by a dielectric heating action. Polyvinyl chloride resin is a good film-forming material when the laminates are so secured together. The movement of material over the table 31 is controlled in any known manner and a festoon of fabric may be provided so that the fabric movement is halted when the diecutter is energized. In the particular apparatus shown, the plastic film layers 17 and 18 are heat-sealed into engagement with each other by conventional dielectric heating means (not shown) provided in the heated diecutter so that when the die cuts the laminates to glove shell form, the plastic films have been heat-sealed together adjacent marginal portions of the glove shell, as indicated at 41 and 42 in FIG. 3. Obviously, the thickness of the various layers used in forming the glove shell 40 are shown in an exaggerated form in the drawing for clarity. The glove shell 40 usually is of ambidextrous shape.

Figure 2:
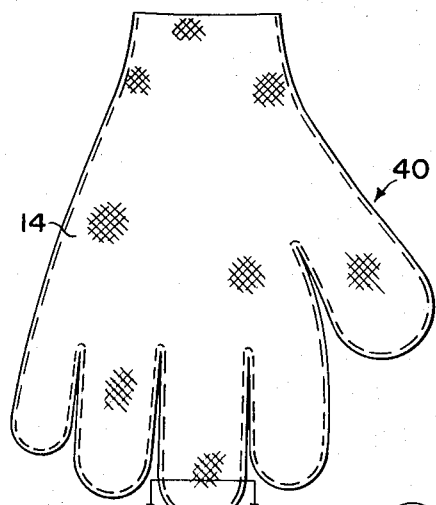
FIG. 2 is an elevation of a glove shell provided in the process of the invention.

Ordinarily, it is preferable that the knitted layers of fabric 13 and 14 provided in the glove shell be on the inside rather than on the outside of a finished glove so that the glove shell shown in FIG. 2 normally is turned inside out after which the glove shell in ultimately stretched or tensioned from ambidextrous glove shell shape over to the shape required to provide either a right- or a left-hand glove.

As a feature of the invention, the glove shells 40 are next heated to about 175° to 185° F. and then immediately pulled onto the glove form to stretch and/or tension the individual layers of the laminates to glove form.

Figure 4:
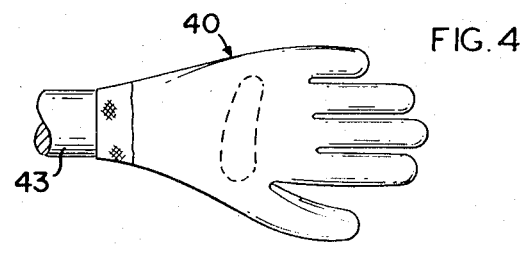
FIG. 4 is a top plan of a glove shell as stretched onto a glove form.
Figure 5:
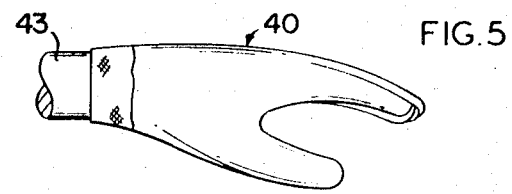
FIG. 5 is a right side elevation of the glove shell and form of FIG. 4.
Figure 6:
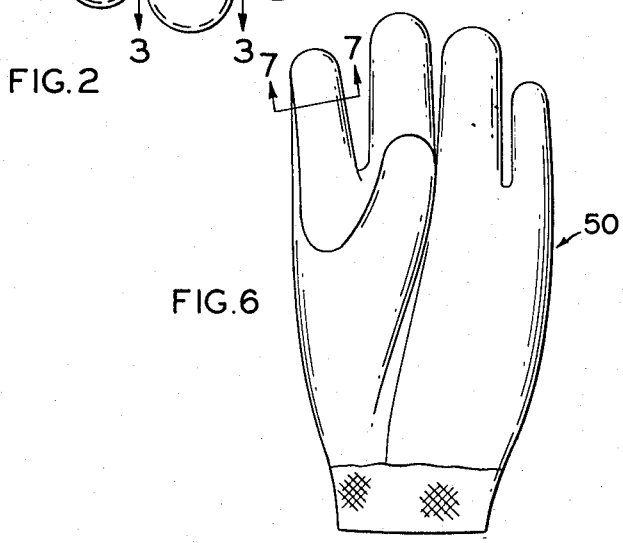
FIG. 6 is an elevation of a left glove provided or obtained from the form shown in FIG. 4.
Figure 7:
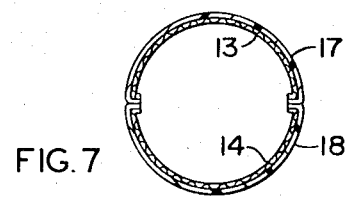
FIG. 7 is an enlarged fragmentary elevation through a portion of the glove of FIG. 6 taken on line 7—7 thereof.

FIGS. 4 and 5 show the shell 40 as stretched and tensioned by being pulled over the glove form 43 provided for forming a cupped or shaped left glove in accordance with the present invention. These forms 43 usually are heated when the glove shells are applied thereto. In all events, the glove forms are next heated to a suitable temperature, such as from approximately 160° to about 180° F. and the glove shells are permitted to remain thereon for about 2 to 5 minutes. By such action, the thermoplastic material and the elastic fabric of the laminates 26 and 28 is relaxed, or set to retain its given shape and to produce the desired right or left glove from the initial ambidextrous glove shell. Usually the gloves and glove forms 43 are then permitted to cool or are cooled to ambient temperatures before the gloves are removed, but they retain the shape given to them by the glove form 43. Obviously, similar but different forms are used to provide right-hand gloves from the ambidextrous glove shells 40.

The finished left-hand glove is indicated as a whole by the numeral 50 and it will provide an effective, satisfactory glove by a minimum of glove forming and producing steps in accordance with the present invention. The seams provided in the ambidextrous glove shells have been twisted slightly and shaped around in stretching the glove shell onto the glove form 43 in the manner described in U.S. Pat. No. 2,716,241.

While the present process shows the provision of two different laminates from individual sheets or layers of elastic fabric and plastic film, obviously, only one of such laminates need be provided and then two different sections of the laminate could be superimposed in relationship to each other with the plastic film layers adjacent for forming the ambidextrous or other glove shells therefrom. Naturally, it is also within the concept of the invention to sew the laminates, such as the laminates 26 and 28, together around the margins thereof to provide the glove shell 40 and then the glove shells can be cut or stamped in any suitable way from the two plies of the laminated fabric to provide the individual glove shell. The plastic films still will aid in bonding the laminates together. Of course, the glove shell 40 has an open end and any suitable wristlet may be secured thereto, if desired.

The present invention also further contemplates the coating of the elastic fabrics 13 and 14 or equivalent with a layer of a thermoplastic material by any conventional manner, such as by flame coating the elastic fabric with a thermoplastic layer or film, by knife or doctor blade coating a liquid plastic material onto the elastic fabric, etc. and then setting the liquid or plastisol material in situ to provide a laminate equivalent to the laminates 26 and 28 as shown. Such laminates can be passed through a drying, heating or fusing oven, if required, prior to the association of two laminates with each other for the attachment together for ultimately forming the ambidextrous glove shell 40 therefrom. However, in all events, application of the usual finishing outer layer of a glove has been provided in a novel and economical manner by the process of the invention.

It will be realized that the heating action to which the glove shell is subjected while on the glove form 43 or equivalent can set or fuse the plastic film-forming material to final shape, if not previously done. It should be particularly noted that the glove formed on and shaped by the glove form 43 is heated while retained in its stretched or tensioned condition, and then permitted to cool while on the glove form. By such action, the glove ultimately stripped from the glove form will retain the shape given to it.

Figure 3:
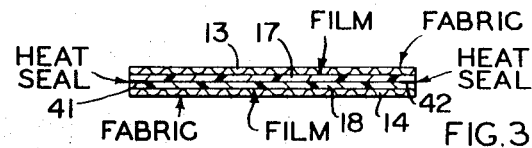
FIG. 3 is an enlarged fragmentary cross section on line 3—3 of FIG. 2.

In some instances, it may be desirable to avoid the step of turning the glove shell 40 inside out and a glove could be produced from the glove shell by the other steps of the invention and avoiding the reversal of the glove shell layers from outside to inside, or vice versa. It also would be possible to use the glove shell 40 as shown in FIGS. 2 and 3 by placing and shaping it on a glove form, and then dipping or coating the glove shell 40, with its knit fabrics on the outer surface thereof, into a suitable liquid, or plastisol material to produce an outer coating thereon. Next the inner and outer coatings would be heated to be fused, relaxed or set to final shape and provide a glove with plastic inner and outer layers bonded together by a fabric intermediate layer.

As previously indicated, any suitable heat-sealable plastic material of known materials can be used, polyvinyl acetate being another typical material. And the heat seal and/or cutting dies used are conventional and may reciprocate or rotate for heat-seal and/or cutting action.

What is claimed is:

1. In a process for making a glove from glove shells, the steps of
   forming at least one laminate of an elastic fabric and a layer of a heat-sealable plastic material,
   superimposing two portions of the laminate with the plastic layers adjacent,
   securing the laminates together in marginal areas thereto to form a glove shell and severing the laminates into pieces to provide glove shells,
   heating the glove shells,
   stretching the heated glove shells to a glove shape,
   heating the stretched glove shells to provide them with permanent glove shape, and
   removing the stretching forces applied to the gloves.

2. A process as in claim 1 wherein the laminates are secured together by a sewing operation.

3. A process as in claim 1 including the steps of laminating a preformed plastic film with the elastic fabric, and securing the laminates together by a heat-seal action.

4. A process as in claim 1 including the steps of applying an outer coating to the elastic fabric and setting such coating by the heating of the glove shell when stretched.

5. In a process for making a shaped glove from glove shells as in claim 1, the steps of heating the glove shell to weaken the plastic film and enable the glove shell to be stretched to glove shape, and cooling the glove while retaining it in stretched condition.

6. In a process for making a shaped glove from ambidextrous glove shells, the steps of
   forming a laminate of a resilient knit fabric and a layer of a heat-sealable plastic material,
   superimposing two of the laminates with the plastic layers adjacent,
   securing the laminates together in marginal areas thereof to form an open-mouthed glove shell therefrom by a heat-seal action and severing the laminates to provide a glove shell,
   turning the glove shell inside out to have the plastic layers on the outside thereof,
   heating the glove shell and stretching it to a glove shape,
   continuing to heat the stretched glove shell,
   cooling the glove while retained in stretched condition to provide it with permanent glove shape, and
   removing the stretching forces applied to the glove.

7. A process as in claim 6 including the step of laminating a preformed plastic film with the elastic fabric.

8. A process as in claim 6 including the step of forming the layer of plastic material in situ directly bonded to the knit fabric.

9. A process as in claim 6 including the step of heating the glove shell to about 175° to about 185° F. prior to stretching the glove shell to glove shape.

10. In a process for making a shaped glove from ambidextrous glove shells including the steps of forming a laminate of a resilient knit fabric and a layer of a heat-sealable plastic material, superimposing two of the laminates with the plastic layers adjacent, securing the laminates together in marginal areas thereof to form open-mouthed glove shells and severing the laminates to provide the ambidextrous glove shells, turning the glove shells inside out to have the plastic layers on the outside thereof, and including the improvement of
   heating the glove shells,
   stretching the glove shells to glove shape,
   additionally heating the stretched glove shells, and
   cooling the glove to provide it with permanent glove shape.

11. A process as in claim 1 including the step of heating the glove shells to from about 175° to about 185° F. and then immediately stretching the glove shells to glove shape.

* * * * *